(12) United States Patent
Trantzas et al.

(10) Patent No.: US 6,360,612 B1
(45) Date of Patent: Mar. 26, 2002

(54) PRESSURE SENSOR APPARATUS

(76) Inventors: Constantin M. Trantzas, 38 Gordon Ave., Briarcliff Manor, NY (US) 10510; Douglas D. Haas, Jr., 56 Signal Hill Trail, Sparta, NJ (US) 07871

(*) Notice: Subject to any disclaimer, the term of this patent is extended or adjusted under 35 U.S.C. 154(b) by 0 days.

(21) Appl. No.: 09/240,381

(22) Filed: Jan. 29, 1999

(51) Int. Cl.[7] .............................. G01L 9/00; G01D 7/00
(52) U.S. Cl. ..................................... 73/753; 73/862.041
(58) Field of Search ......................... 73/725, 719, 777, 73/774, 775, 780, 753, 862.473, 862.474, 862.627, 862.628, 862.68, 862.048, 862.046, 862.621, 862.622, 862.625, 862.626, 862.629, 862.632, 862.638, 862.042, 862.043, 862.045, 862.041; 200/86 R, 5 A

(56) References Cited

U.S. PATENT DOCUMENTS

| | | | |
|---|---|---|---|
| 4,220,815 A | * 9/1980 | Gibson et al. | 178/18 |
| 4,233,011 A | 11/1980 | Bolender et al. | 15/14 |
| 4,509,237 A | 4/1985 | Volz et al. | 29/116 |
| 4,520,723 A | 6/1985 | Pav et al. | 100/162 |
| 4,529,959 A | * 7/1985 | Ito et al. | 338/295 |
| 4,707,570 A | * 11/1987 | Ide et al. | 178/18 |
| 4,712,472 A | 12/1987 | Meisen et al. | 100/37 |
| 4,729,153 A | 3/1988 | Pav et al. | 29/116 |
| 4,898,012 A | 2/1990 | Jones et al. | 72/11 |
| 5,048,353 A | 9/1991 | Justus | 73/862 |
| 5,072,077 A | * 12/1991 | Klein | 200/5 A |
| 5,365,799 A | * 11/1994 | Okada | 73/862.041 |
| 5,379,652 A | 1/1995 | Allonen | 73/862 |
| 5,383,371 A | 1/1995 | Laitenen | 73/862 |
| 5,447,076 A | * 9/1995 | Ziegler | 73/862.626 |
| 5,562,027 A | 10/1996 | Moore | 100/35 |
| 5,583,303 A | * 12/1996 | Franz | 73/862.046 |
| 5,592,875 A | 1/1997 | Moschel | 100/99 |
| 5,699,729 A | 12/1997 | Moschel | 100/99 |
| 5,953,230 A | 9/1999 | Moore | 364/469 |

FOREIGN PATENT DOCUMENTS

| | | |
|---|---|---|
| JP | 6015533 | 1/1985 |
| JP | 6015534 | 1/1985 |
| JP | 62165135 | 7/1987 |
| JP | 01157850 | 6/1989 |
| JP | 04221727 | 8/1992 |
| JP | 06182977 | 7/1994 |

OTHER PUBLICATIONS

Moore and Kennedy, Electronic Nip Impressions—A New Diagnostic Approach, TAPPI Engineering Conference Report, pp. 547–551.

Web Page http://www.btrplc.com, "Stowe Woodward Moves Up the Value Ladder", by Bill Butterfield and Robert Moore, Nov. 23, 1998.

Haverty and Fildes, Enhancing Computer Game Joysticks With Smart Force Transducers, Sensors Journal, Sep . 1998, pp. 91–96.

Tekscan Product Data.

Uniforce Product Data.

Interlink Product Data.

Incontrol Solutions Product Data.

* cited by examiner

*Primary Examiner*—Benjamin R. Fuller
*Assistant Examiner*—Abdullahi Aw-Musse
(74) *Attorney, Agent, or Firm*—Sofer & Haroun, LLP

(57) ABSTRACT

A pressure sensor apparatus comprising a first electrode and a second electrode, each attached to and supported by one of a pair of backing sheets; a resistive electrode, having a known electrical resistance, attached to and supported by one of the backing sheets so as to provide an electrical conduction between the first electrode and the second electrode; a shunt electrode, having a resistance that is lower than the resistance of the resistive electrode and attached to and supported by one of the backing sheets; and at least one spacer disposed so as to maintain the shunt electrode in a non-conductive arrangement relative to the resistive electrode, the shunt electrode configured such that, when pressure acts thereon, the shunt electrode contacts the resistive electrode and provides an electrical conduction between the resistive electrode and the shunt electrode.

28 Claims, 14 Drawing Sheets

PRESSURE SENSOR APPARATUS

FIELD OF THE INVENTION

This invention relates to a pressure sensor apparatus, and more particularly to a thin, flexible device that allows measurements relating to the position of pressure on the sensor to be determined.

BACKGROUND OF THE INVENTION

There are many application in which it is desirable to sense pressure between two objects. For instance, it is often necessary to sense pressure between nipped rollers employed in the paper making and converting industries, as discussed in detail in Applicant's co-pending application, U.S. patent application Ser. No. 09/239,610, which is incorporated by reference herein as fully as if set forth in its entirety.

Force sensing resistors are employed in the prior art in order to measure an amount of force between objects. FIG. 20 illustrates one example of a force sensing resistor (e.g.—a linear potentiometer), having two polymer films or sheets. On one sheet, a conducting pattern is deposited on the polymer in the form of interdigiting electrodes 2. Semi-conducting polymer 1, which is a pressure-responsive resistive medium having a force/resistance characteristic such as illustrated in the graph of FIG. 21, is deposited on the other sheet. The pressure responsive resistive medium, as shown in FIG. 21, has a resistance that lowers as the pressure exerted thereon increases. When the two sheets of the force sensing resistor are brought together, the resistance between the interdigiting electrodes is very high. However, when a force is applied, the resistance of semi-conducting polymer 1 reduces sufficiently to shunt an electrical conduction at the interdigiting electrodes where the force is applied.

Force and position sensing resistors, which may also comprise a linear potentiometer, are employed in the prior art to determine a position of an applied force. FIG. 22 illustrates an example of such a linear potentiometer, having fixed resistor strip 13 with hot end 15 and ground end 14. Wiper 12 comprises a plurality of conducting fingers as shown. Force sensing layer 11 is brought together with wiper 12, such that when a force is applied to force sensing layer 11, the wiper contacts are shunted through force sensing layer 11 to the conducting fingers at the location of the applied force. A voltage read across wiper 12 is proportional to the distance along the device that the force is applied.

Another type of force and position sensing resistor that exists in the prior art is an XYZ pad, which is illustrated in FIG. 23. The XYZ pad shown incorporates the same basic features as a linear potentiometer, except that the XYZ pad employs two such arrangements so as to measure the position of an applied force in a plane. Specifically, force sensing layer 11 is double sided and is disposed between the conducting fingers of wiper 12a arranged in one direction, and the conducting fingers of wiper 12b arranged in a perpendicular direction. On each side of the pad, a force applied to double-sided force sensing layer 11 results in the wiper contacts being shunted through force sensing layer 11 to the conducting finger adjacent to the location of the applied force. A voltage read across wiper 12a is thus proportional to the distance along the x-axis of the device that the force is applied, while a voltage read across wiper 12b is proportional to the distance along the y-axis of the device that the force is applied. By determining the distance along the x- and y-axes, the position of the applied force within a plane is defined.

One problem with traditional force sensing resistors and the force and position sensing resistors in the prior art is that they are inaccurate. For instance, a force applied to a prior art sensor may inadvertently shunt an electrical conduction through an area that is larger than the particular area that pressure is applied to. This occurs because, when a force is applied to the force sensing layer, the force sensing layer contacts the conducting fingers of the wiper adjacent to the location of the applied force, in addition to contacting the conducting finger of the wiper at the precise location of the applied force. The result is that the voltage read across the wiper, and the position determined therefrom, is inaccurate. This problem is worsened if an overlay or laminating surface is used, since the force is further spread out. Traditional force sensing resistors and force and position sensing resistors in the prior art also require substantial calibration, and must account for such variables as temperature, humidity, and aging. In addition, the pressure-responsive resistance medium is expensive to use.

Thus, there is a need for an improved and inexpensive sensor for measuring the width and position of an object on the sensor accurately and conveniently without the need for calibration.

SUMMARY OF THE INVENTION

According to one embodiment, the present invention comprises a pressure sensor apparatus. The apparatus comprises a first electrode and a second electrode, each disposed on one of a pair of backing sheets; a resistive electrode, having a known electrical resistance, disposed on one of the pair of backing sheets so as to provide an electrical conduction between the first electrode and the second electrode; a shunt electrode, having a resistance that is lower than the resistance of the resistive electrode, disposed on one of the pair of backing sheets; and at least one spacer disposed so as to maintain the shunt electrode in a non-conductive arrangement relative to the resistive electrode, the shunt electrode configured such that when pressure acts thereon, the shunt electrode contacts the resistive electrode so as to provide an electrical conduction between the resistive electrode and the shunt electrode.

In accordance with one embodiment of the invention, the linear distance between two outer locations of pressure on the sensor corresponds to a change in resistance between the first and second electrodes. In accordance with another embodiment of the invention, the width of the object exerting pressure on the sensor corresponds to a change in resistance between the first and second electrodes. In accordance with another embodiment of the invention, the position of the object exerting pressure on the sensor corresponds to a change in resistance between the first and shunt electrodes.

According to another embodiment, the at least one spacer prevents the shunt electrode from contacting the resistive electrode except at a location of the applied force. In another embodiment, a plurality of spacers are disposed on the resistive electrode, while in another embodiment, a single spacer having windows is disposed on the resistive electrode.

According to another embodiment, the electrodes are disposed on one of the pair of backing sheets by printing, etching, silk-screening and spraying. According to another embodiment, the at least one spacer is disposed on one of the pair of backing sheets by printing, etching, silk-screening and spraying. In still another embodiment, the first, second and shunt electrodes are comprised of a material selected from a group consisting of copper, silver, aluminum and a conductive ink such as a graphite-based polymer thick film ink. In still another embodiment, the third electrode is comprised of a material selected from a group consisting of carbon and a non-conductive ink such as a titanium dioxide resistive ink. Preferably, at least one of the pair of backing sheets is thin and flexible, such as comprising a material selected from the group consisting of Mylar™, Kapton™ and polyester.

DETAILED DESCRIPTION OF THE DRAWINGS

In the drawings in which like reference characters denote similar elements throughout the several views.

DETAILED DESCRIPTION OF THE INVENTION

Figure 1:
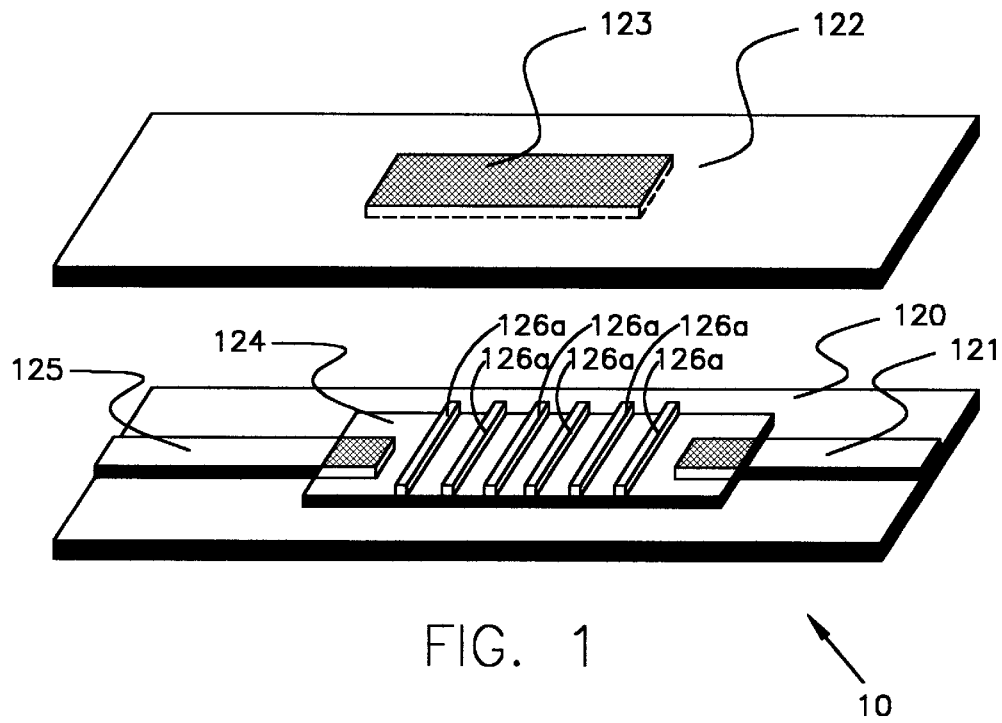
FIG. 1 illustrates the salient features of a pressure sensor apparatus, in accordance with one embodiment of the present invention.

FIG. 1 illustrates the salient features of pressure sensor apparatus 10, in accordance with one embodiment of the present invention. First electrode 121 and second electrode 125 are disposed on first backing sheet 120, which is preferably thin and flexible. Resistive electrode 124 is coupled to first electrode 121 and second electrode 125. Resistive electrode 124 provides an electrical conduction between first electrode 121 and second electrode 125. Resistive electrode 124 has a known resistance value, R. Shunt electrode 123 is disposed on second backing sheet 122, which is also preferably thin and flexible. Shunt electrode 123 has a low electrical resistance relative to the known electrical resistance of resistive electrode 124.

Figure 17:
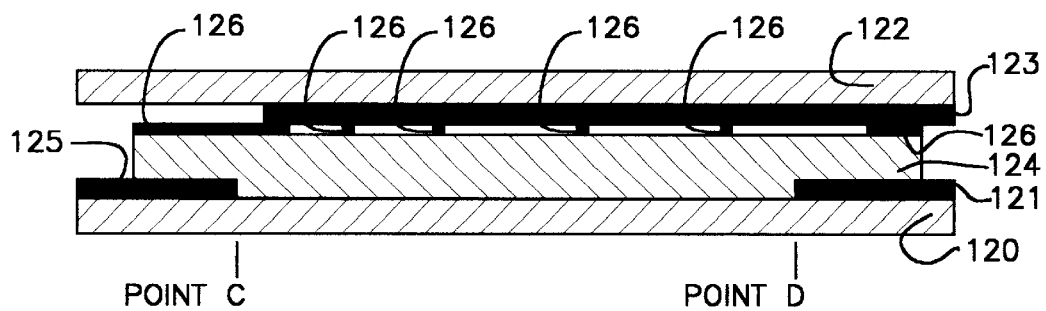
FIG. 17 is a cross-sectional view of first and second backing sheets brought together, in accordance with one embodiment of the invention.

Disposed on resistive electrode 124 is at least one spacer 126a, which is made of an electrically insulating material. According to one embodiment of the invention, backing sheets 120 and 122 are brought together so that shunt electrode 123 is disposed on spacer elements 126a. FIG. 17, which is a cross-sectional view of first backing sheet 120 brought together with second backing sheet 122, shows that spacer elements 126a maintain shunt electrode 123 in a non-conductive arrangement relative to resistive electrode 124. FIG. 17 also shows that, according to one embodiment, shunt electrode 123 is disposed in a non-conductive arrangement relative to first and second electrodes 121 and 125.

It should be noted, however, that according to another embodiment of the invention, pressure sensor device 10 employs resistive electrode 124 insulated from shunt electrode 123 by at least one spacer 126. In this embodiment, electrodes 121 and 125 are not employed. As such, all measurements may be made along desired locations on resistive electrode 124.

As previously indicated, first and second backing sheets 120 and 122 are preferably thin (preferably about 0.001 inches in thickness) and flexible, although it is recognized that one of the two backing sheets may be solid. Preferably, the backing sheets are made from a substantially non-conductive, flexible material such as Kapton™, Mylar™ or polyester. If a solid material is used for either of the backing sheets, non-conductive materials such as plastics and derivatives may be utilized. In another embodiment of the invention, second backing sheet 122 is conductive so that second backing sheet 122 and shunt electrode 123 form a single, integrated whole.

First, second and shunt electrodes 121, 125 and 123 are preferably comprised of conductive or semi-conductive material such as silver, copper, aluminum, etc. First, second and shunt electrodes 121, 125 and 123 may be disposed on first or second backing sheets 120 and 122 by etching, printing, silk-screening or spraying the material onto the backing sheets. In the case of printing the electrode on a backing sheet, a graphite-based polymer thick film ink may be used, such as Electrodag 423SS™ offered by Acheson Colloids Co.™

Resistive electrode 124 is preferably comprised of a relatively less conductive, more highly resistive, material having a known resistance, such as carbon. Resistive electrode 124, like the other electrodes, may be disposed on a backing sheet by etching, printing, silk-screening or spraying the material thereon. In the case of printing the electrode on a backing sheet, a titanium dioxide resistive ink may be used, such as Ink type SS24210™ offered by Acheson Colloids Co.™

Spacer elements 126a are preferably electrically insulating materials, such as acrylic or oil based inks and paints. Like the electrodes, spacer elements 126a may be disposed on a backing sheet by etching, printing, silk-screening or spraying the electrically insulating material thereon. Alternatively, in embodiments such as those described below in FIGS. 7, 8 and 10, windowed spacer 126 may comprise a sheet of Mylar™, Kapton™ or polyester material having windows disposed therein. In this embodiment, windowed spacer 126 may be held in position by an adhesive.

Figure 12:
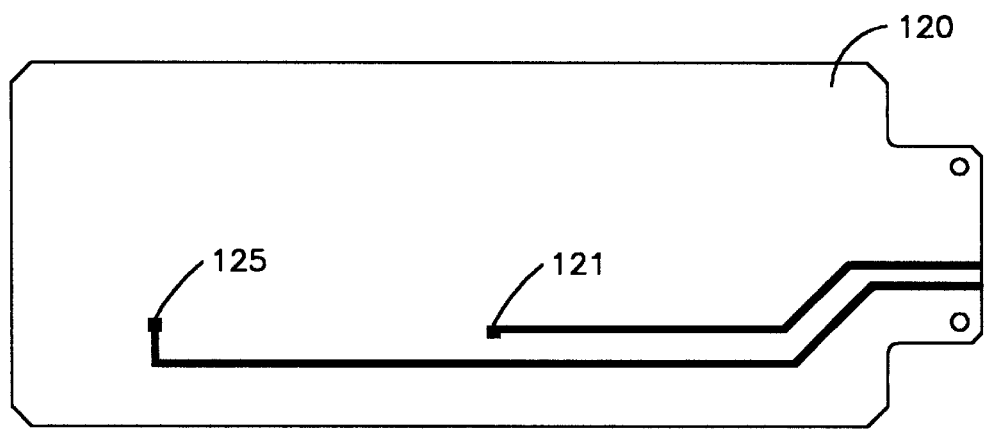
FIGS. 12–16 illustrate a pressure sensor apparatus assembled in successive manufacturing steps, in accordance with one embodiment of the invention.
Figure 13:
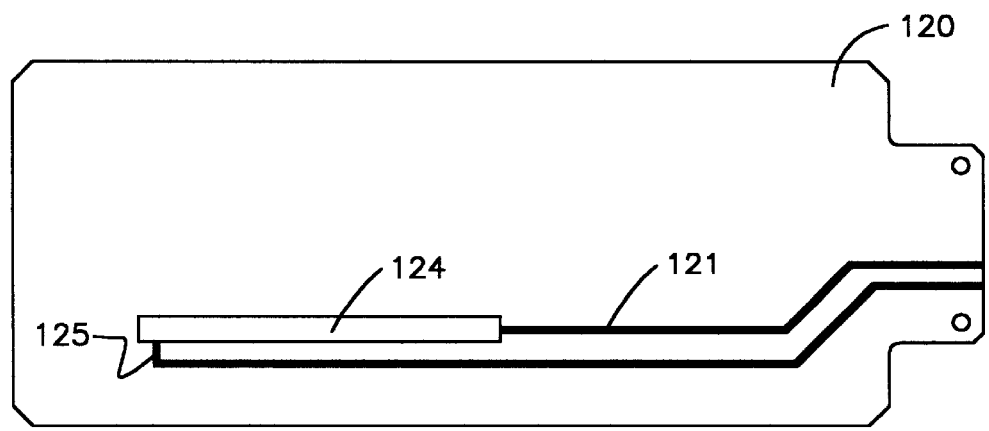
Figure 14:
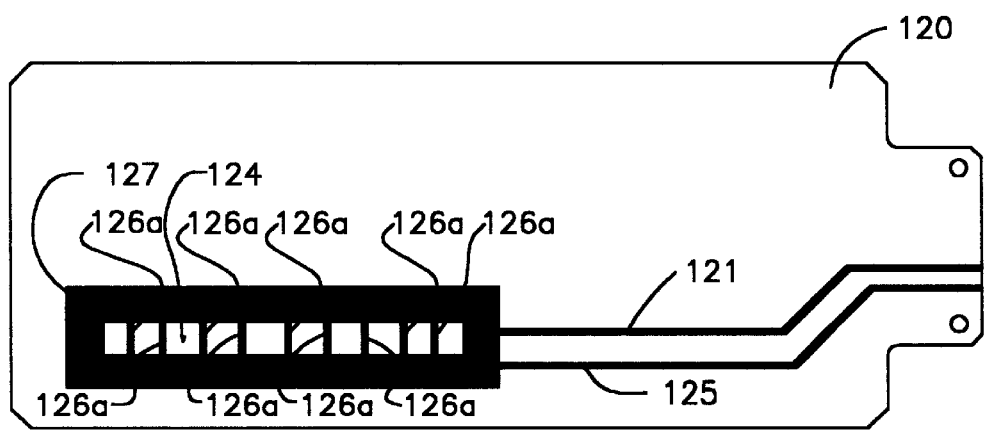

FIGS. 12–16 illustrate steps of a method of manufacturing a pressure sensor apparatus 10, in accordance with one embodiment of the invention. FIG. 12 shows first backing sheet 120 with first electrode 121 and second electrode 125 disposed thereon. In FIG. 13, resistive electrode 124 is disposed on first backing sheet 120 so as to electrically connect first electrode 121 and second electrode 125. In FIG. 14, windowed spacer 126 is disposed over resistive electrode 124.

Figure 15:
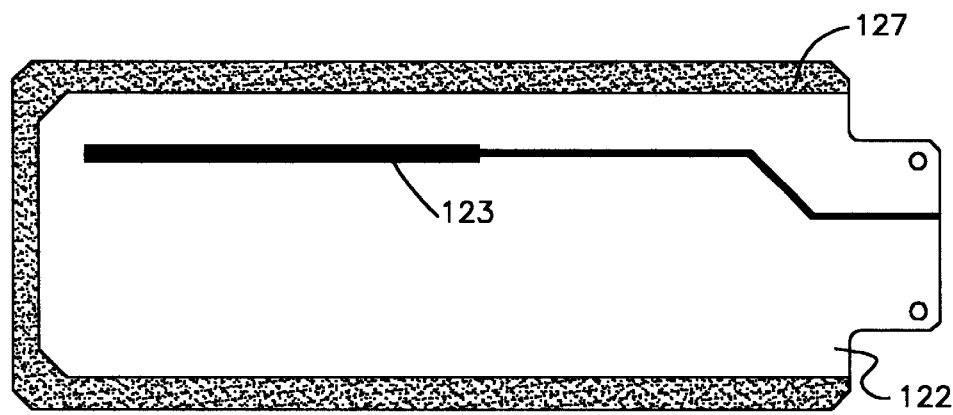
Figure 16:
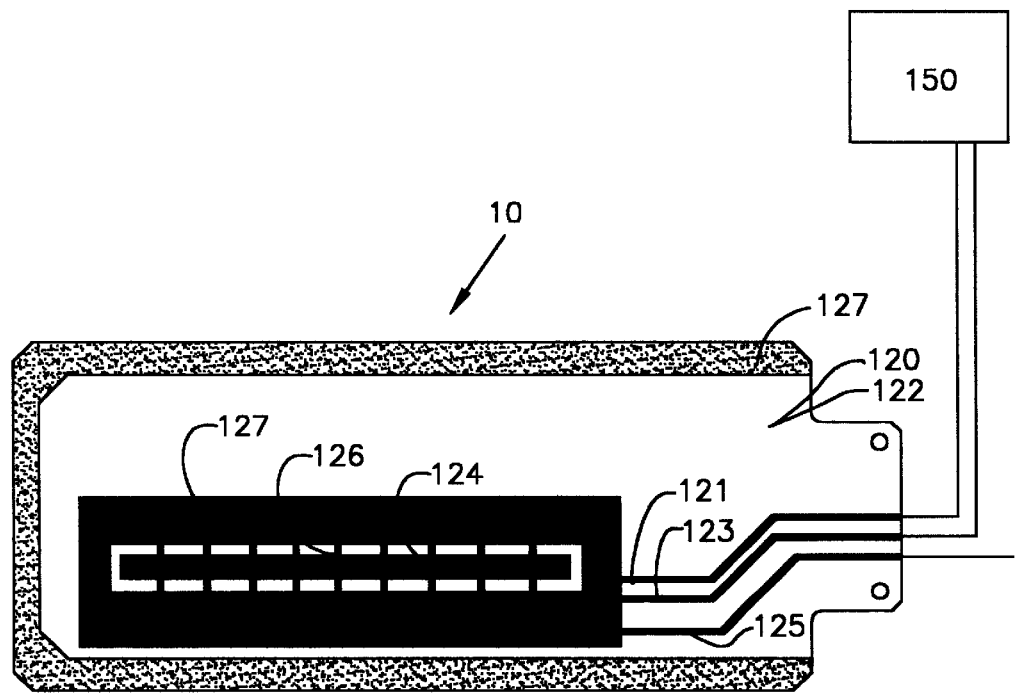

In FIG. 15, shunt electrode 123 is disposed on second backing sheet 122, which also has an adhesive material 127 disposed thereon. In FIG. 16, first backing sheet 120 and second backing sheet 122 are brought together and held in place by adhesive material 127. As shown, according to one embodiment of the invention, when first and second backing sheets 120 and 122 are brought together, shunt electrode 124 is positioned over the windows of windowed spacer 126 so that an applied pressure causes shunt electrode 123 to contact resistive electrode 124, as previously described.

It is noted that, according to another embodiment of the invention, a single pair of backing sheets, held in operative engagement with each other, may comprise more than one pressure sensing devices arranged thereon. For instance, according to one embodiment, first backing sheet 120 may have disposed thereon two or more sets of first, second and resistive electrodes 121, 125 and 124 with a plurality of spacer elements 126a, and second backing sheet 122 may have disposed thereon two or more shunt electrodes 123. In this embodiment, each set of electrodes and spacers would, when first and second backing sheets are brought together, be arranged as shown in FIG. 16.

Additionally, it is noted that, in a preferred embodiment, pressure sensor apparatus 10 is laminated or heat-sealed so as to protect it in wet or harsh environments.

The arrangement of pressure sensing device 10, in accordance with the present invention, allows at least two measurements to be determined when an object is placed on the sensor. The first measurement corresponds to the linear distance between the outer locations of pressure on the sensor, which, according to one embodiment, is the width of the object in contact with the sensor. The second measurement corresponds to the position of the object on the sensor.

With respect to the first measurement, according to one embodiment, when no pressure is acting upon pressure sensor apparatus 10, an electrical conduction is provided between first and second electrodes 121 and 125 via resistive electrode 124. The electrical conduction provided is determined by the resistance of resistive electrode 124, the thickness of resistive electrode 124 and the linear distance between first and second electrodes 121 and 125. When pressure does act upon the sensor, shunt electrode 123 is displaced at the position of the force towards resistive electrode 124, and causes an electrical conduction to be provided between resistive electrode 124 and shunt electrode 123.

Figure 18:
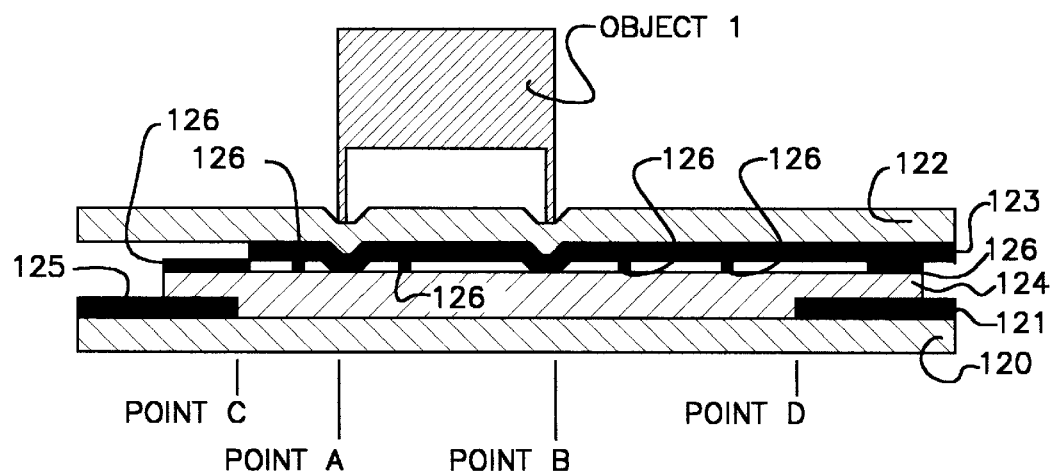
FIG. 18 shows a first object that applies pressure on the sensor, in accordance with one embodiment of the invention.

For instance, FIG. 18 shows object 1 that applies pressure on the sensor at points A and B, which are the outer locations of the applied pressure. As shown, at points A and B, shunt electrode 123 contacts resistive electrode 124. Due to the relative low resistance of shunt electrode 123, an electrical current is shorted through shunt electrode 123 from point A to point B. The shorting of the current through shunt electrode 124 reduces the total resistance of resistive electrode 124 from first electrode 121 to second electrode 125. The change in the resistance of resistive electrode 124 corresponds to the linear distance from point A to point B, and is measurable by measuring means 150 such as an ohm-meter.

Additionally, as mentioned above, the sensor arrangement of the present invention allows a second measurement, corresponding to the position of the object on the sensor, to be determined. Returning to FIG. 17, when pressure is exerted on shunt electrode 123 and causes shunt electrode 123 to contact resistive electrode 124, an electrical conduction is provided between first electrode 121 and shunt electrode 123. Prior to the exertion of pressure, the resistance between first electrode 121 and shunt electrode 123 is infinite, because spacers 126 produce an open circuit. When pressure is exerted, however, the circuit is closed and the resistance between first electrode 121 and shunt electrode 123 is measurable by measuring means 150, such as an ohm-meter. The resistance between first electrode 121 and shunt electrode 123 corresponds to the linear distance from point D at electrode 121 to point B at the outer edge of the applied pressure.

Figure 19:
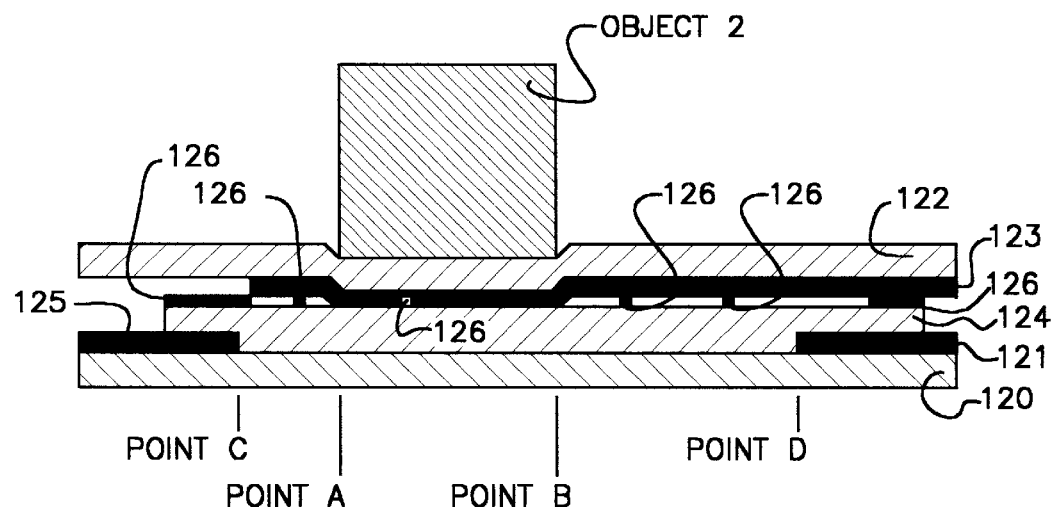
FIG. 19 shows a second object that applies pressure on the sensor, in accordance with one embodiment of the invention.
Figure 20:
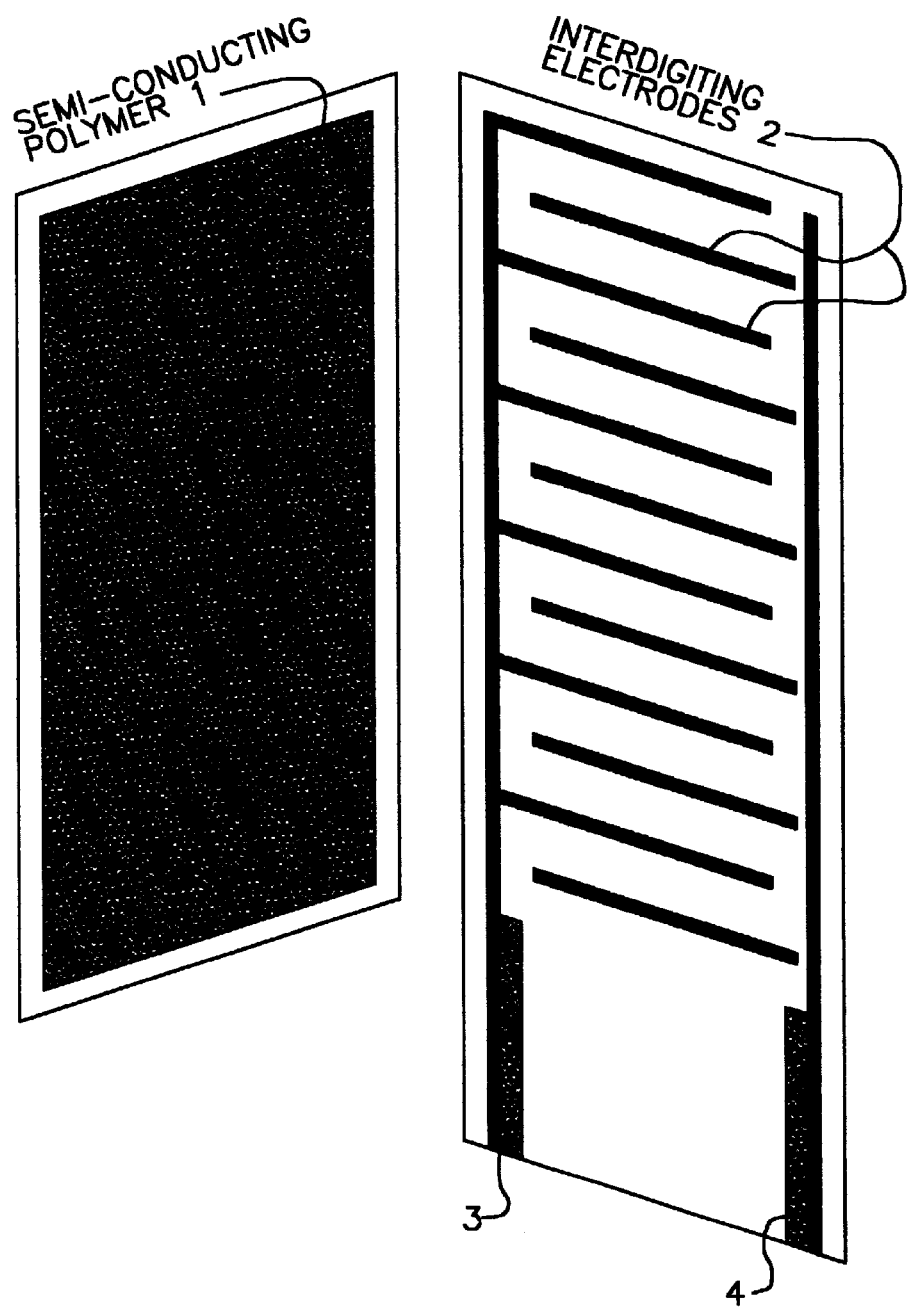
FIG. 20 illustrates a force sensing resistor, according to the prior art.
Figure 21:
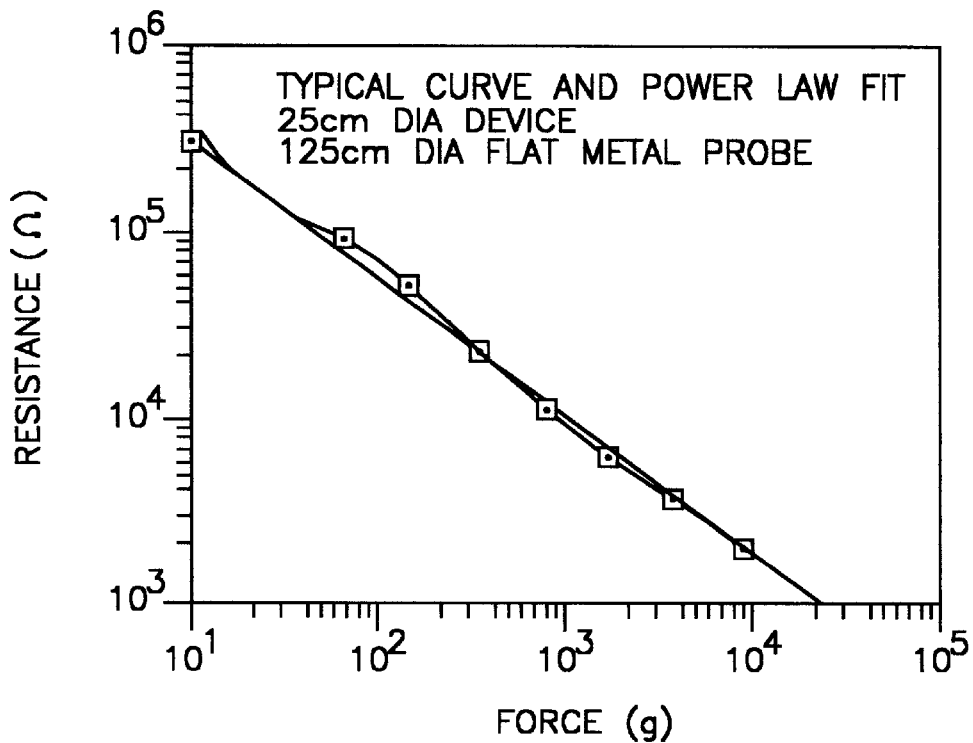
FIG. 21 is a graph that illustrates the force/resistance characteristics of a pressure responsive semi-conducting polymer, according to the prior art.
Figure 22:
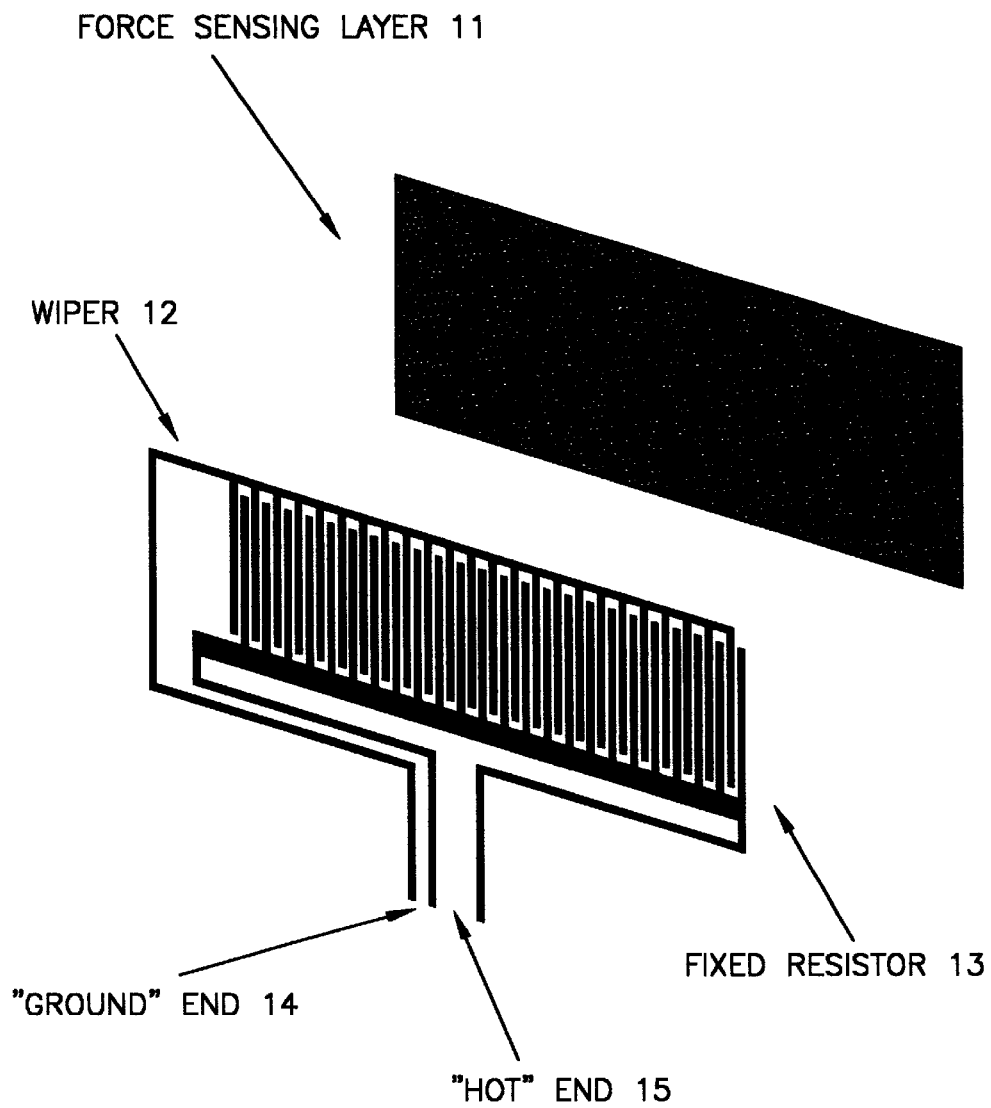
FIG. 22 illustrates a force and position sensing resistor, according to the prior art.
Figure 23:
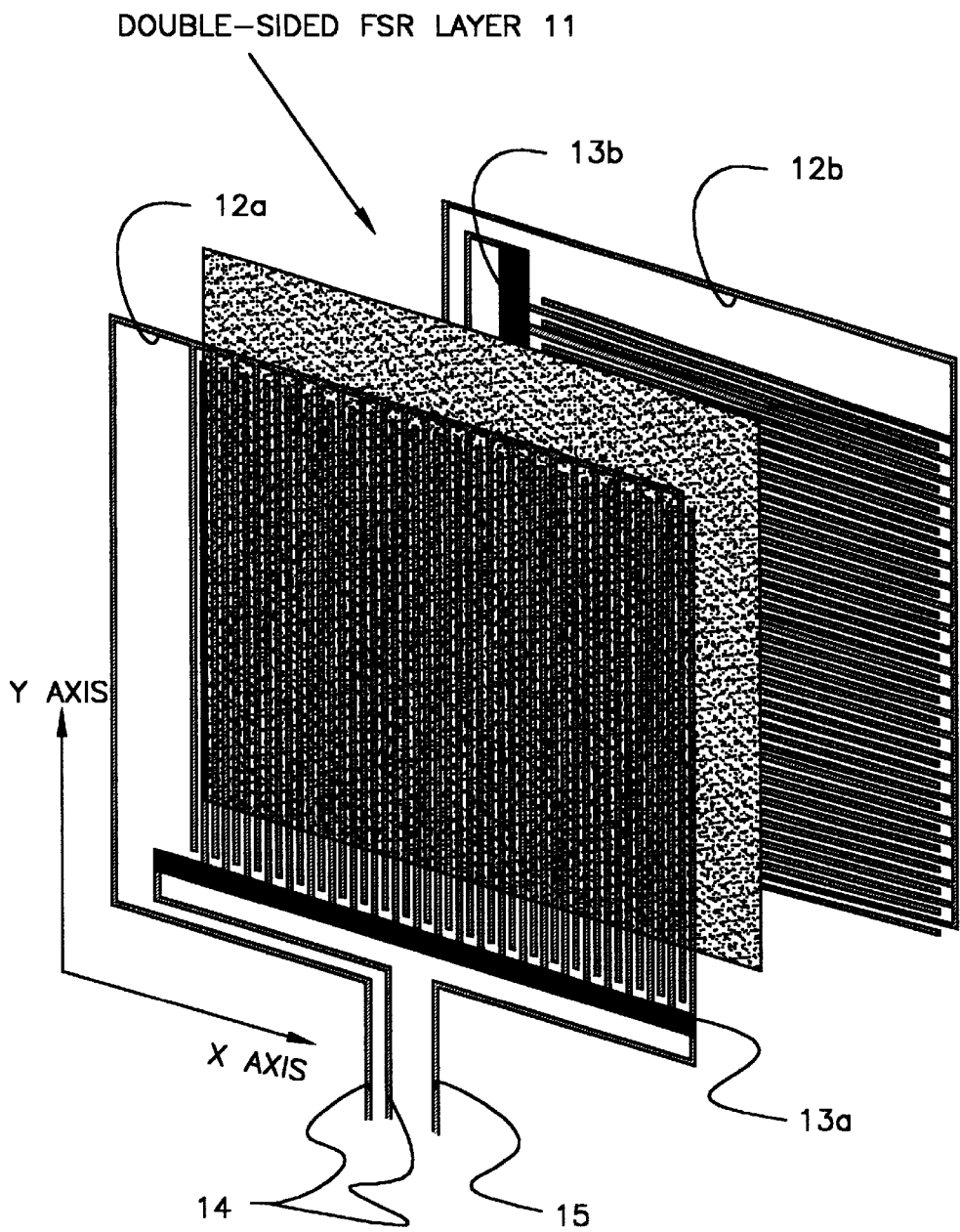
FIG. 23 illustrates an XYZ pad, according to the prior art.

FIG. 19 illustrates how the two measurements are determined when an object having a different shape is placed on the sensor. FIG. 19 shows object 2, which differs from object 1 of FIG. 18 in that its entire surface area is in contact with, and causing pressure to be experienced upon, the sensor. In this respect, object 2 more closely resembles the previously discussed application wherein two nipped rollers are in contact with each other. At points A and B, which are the outer edges of the applied pressure, shunt electrode 123 contacts resistive electrode 124, and due to the low resistance of shunt electrode 123 relative to resistive electrode 124, an electrical conduction is provided in shunt electrode 123 from point A to point B.

As in FIG. 18, the shorting of the current through shunt electrode 124 reduces the total resistance of resistive electrode 124 from first electrode 121 to second electrode 125. The resistance of resistive electrode 124 corresponds to the linear distance from point A to point B, and is measurable by measuring means 150, such as an ohmmeter. As discussed in Applicant's co-pending application previously referenced herein, the distance from point A to point B may, in some circumstances, also correspond to the pressure between the two rollers.

Similarly, the resistance between first electrode 121 and shunt electrode 123 corresponds to the linear distance from point D to point B, and is measurable by an ohm-meter. As previously discussed, the distance from point D to point B corresponds to the position of the applied pressure. The location of the object is thus calculated by measuring the change in the resistance between first electrode 121 to shunt electrode 123.

Spacer elements 126a, in accordance with one embodiment, prevent the applied pressure from being spread, i.e.—permitting an electrical conduction through an area that is larger than the particular area that pressure is applied to. In other words, spacer elements 126a prevents shunt electrode 123 from contacting resistive electrode 124 except at the precise location of the applied force. In each of the embodiments shown in FIGS. 18 and 19, the measurements obtained (the linear distance corresponding to the outer pressure locations or width of the object on the sensor, and the linear distance corresponding to the position of the object on the sensor) are accurate because spacer elements 126a prevent shunt electrode 123 from contacting resistive electrode 124 at any point except the precise location of the applied force. Various configurations of spacer elements 126a are contemplated, some of which are discussed in greater detail below.

Figure 2:
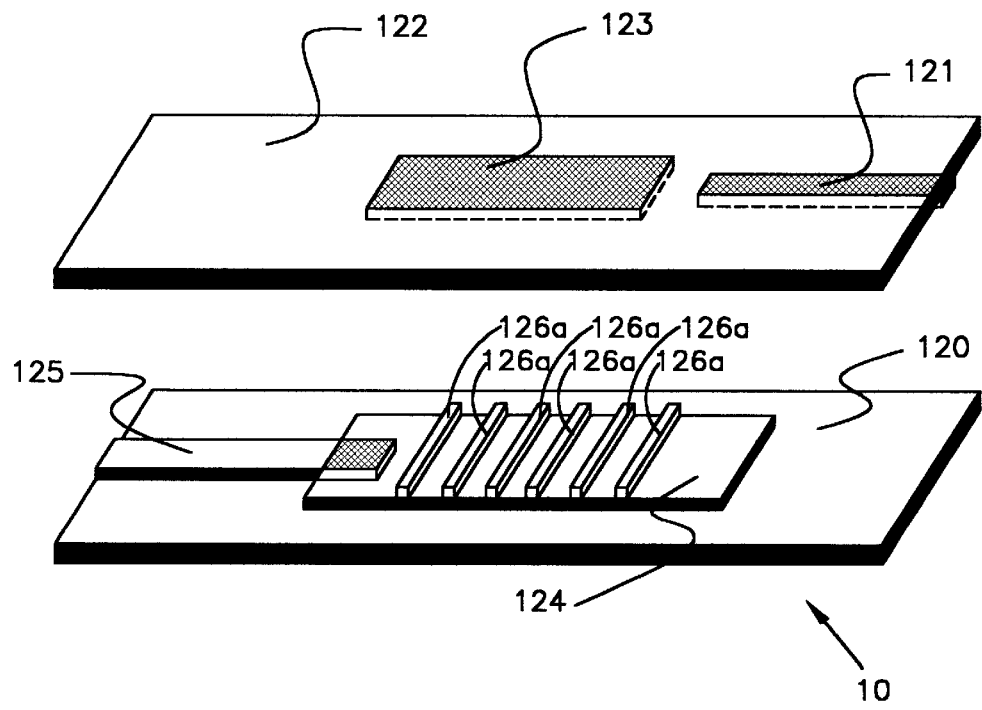
FIGS. 2–11 illustrate several embodiments of the pressure sensor apparatus of the present invention, having various configurations.

It is recognized that there exists numerous embodiments having the features of the present invention. FIGS. 2–11 illustrate some of the embodiments. For instance, FIG. 2 illustrates the invention substantially as described in connection with FIG. 1, but having first electrode 121 disposed on backing sheet 122. In this configuration, first electrode 121 contacts resistive electrode 124 when first backing sheet 120 and second backing sheet 122 are brought together. In all other respects, the pressure sensing device 10 of FIG. 2 operates in the same way as the pressure sensing device of FIG. 1.

Figure 3:
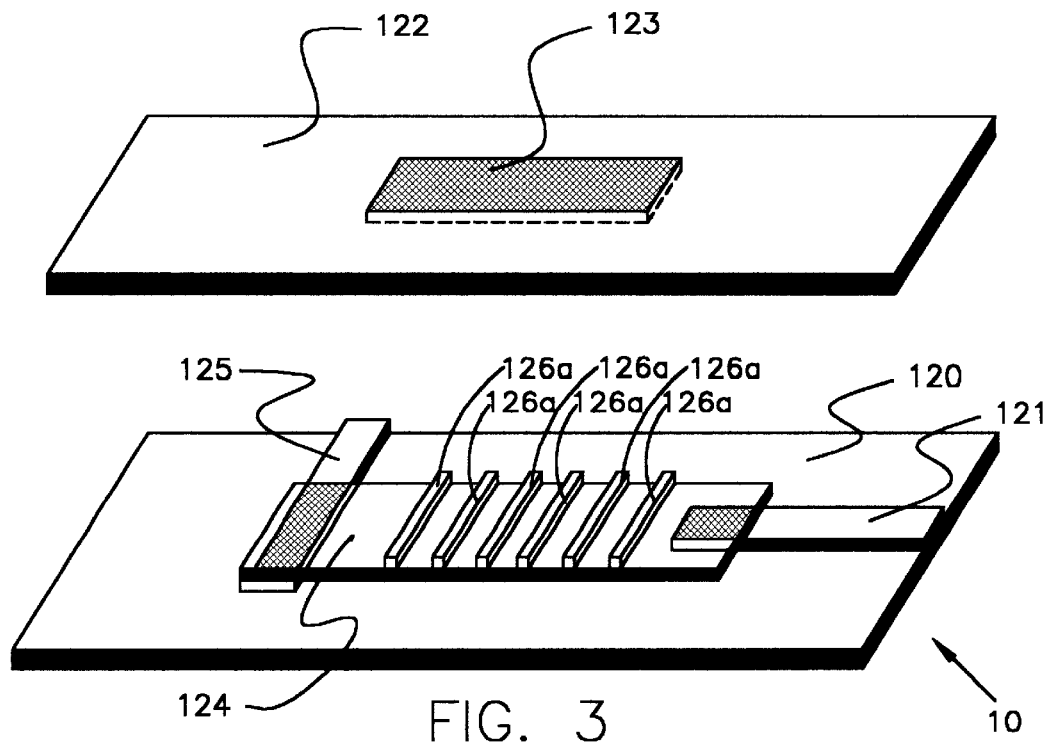
Figure 4:
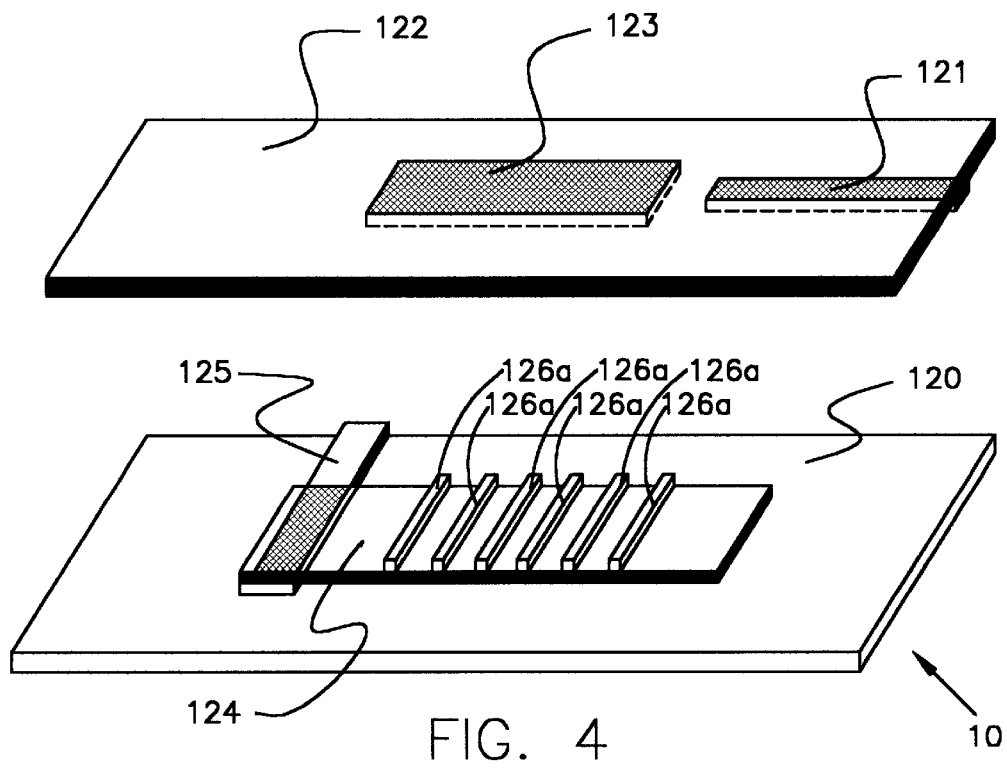

FIGS. 3 and 4 illustrate other configurations of pressure sensing device that also operate in the same way as the pressure sensing device in FIGS. 1 and 2. FIGS. 3 and 4 show second electrode 125 disposed on first backing sheet 120 at a 90 degree angle relative to its position in FIGS. 2 and 3, while first electrode 121 is alternatively disposed on first or second backing sheets, 120 and 122. As previously described, when first and second backing sheets 120 and 122 are brought together, resistive electrode 124 provides an electrical conduction between first electrode 121 and second electrode 125, and spacer elements 126a maintain shunt electrode 123 in a non-conductive arrangement with resistive electrode 124 until a pressure is applied to shunt electrode 123.

Figure 5:
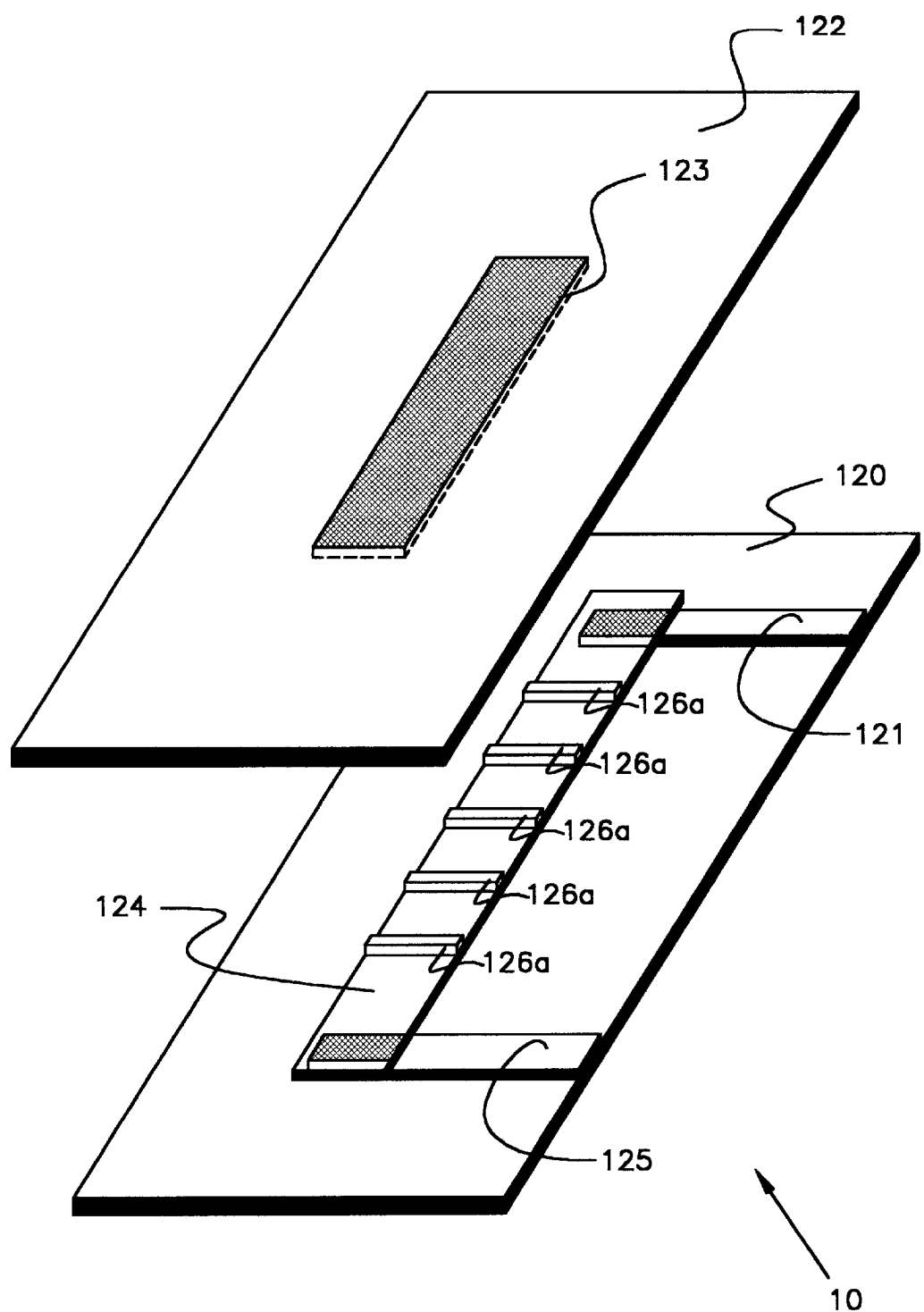
Figure 6:
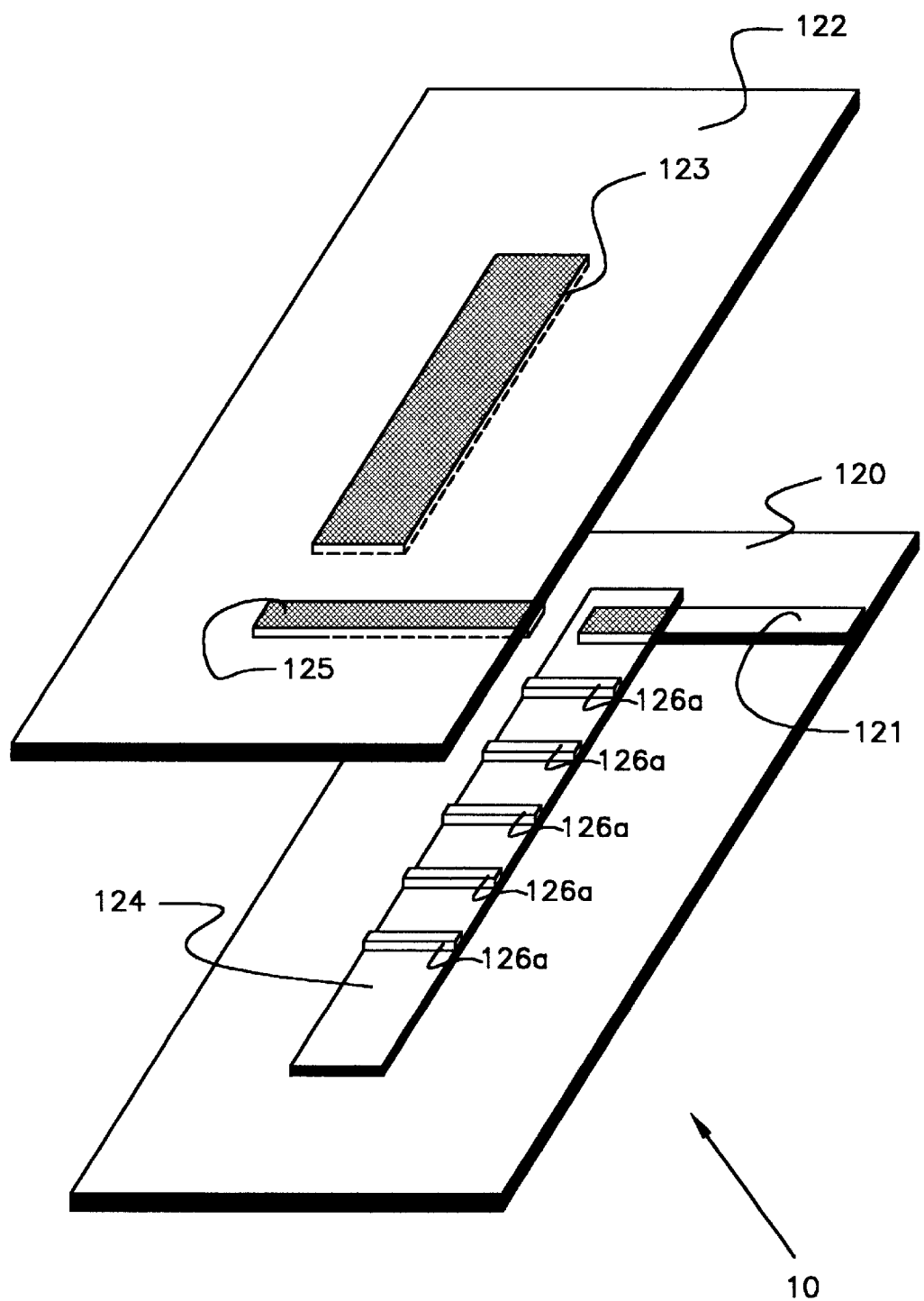

FIGS. 5 and 6 show both first and second electrodes 121 and 125 to be positioned at a 90 degree angle relative to their positions in FIGS. 1 and 2, while FIG. 5 shows both first and second electrodes 121 and 125 disposed on first backing sheet 120. FIG. 6, on the other hand, shows first electrode 121 disposed on first backing sheet 120 and second electrode 125 disposed on second backing sheet 122. It should be noted that the present invention is not limited in scope by which of the pair of backing sheets the electrodes are disposed on, or by the angle at which the electrodes are positioned on the backing sheets.

In each of the figures described, when first and second backing sheets 120 and 122 are brought together, resistive electrode 124 provides an electrical conduction between first electrode 121 and second electrode 125, and spacer elements 126a maintain shunt electrode 123 in a non-conductive arrangement with resistive electrode 124 until a pressure is applied to shunt electrode 123. The current shunted through shunt electrode 123 causes a change in the resistance measured between the electrodes, which correspond to the width of the object applying pressure on the sensor and the position of the object on the sensor.

Figure 7:
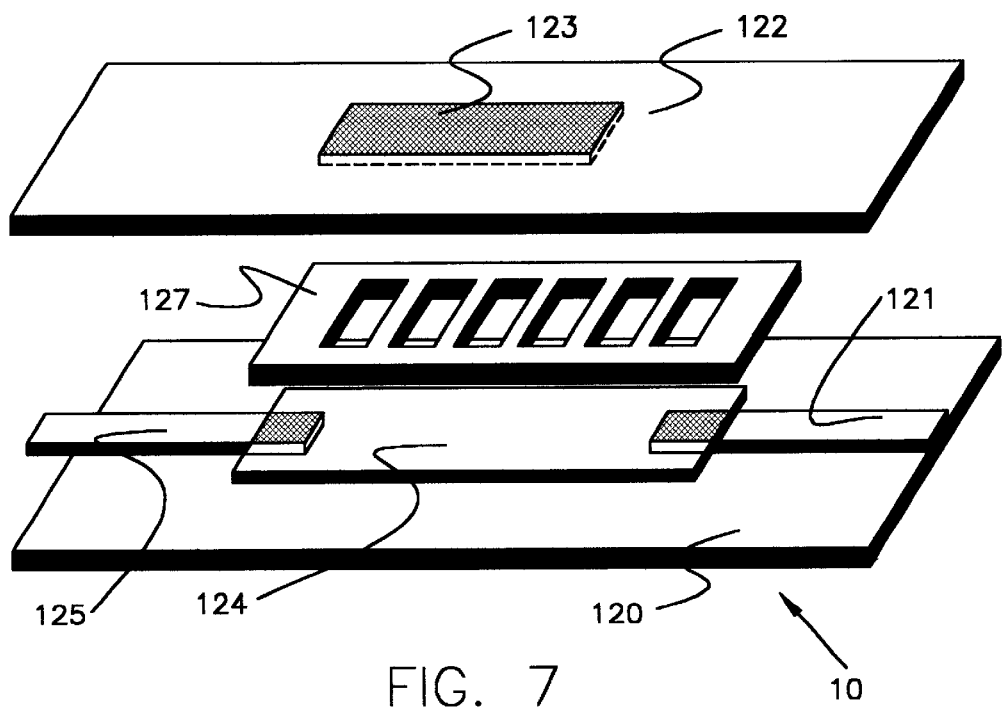
Figure 8:
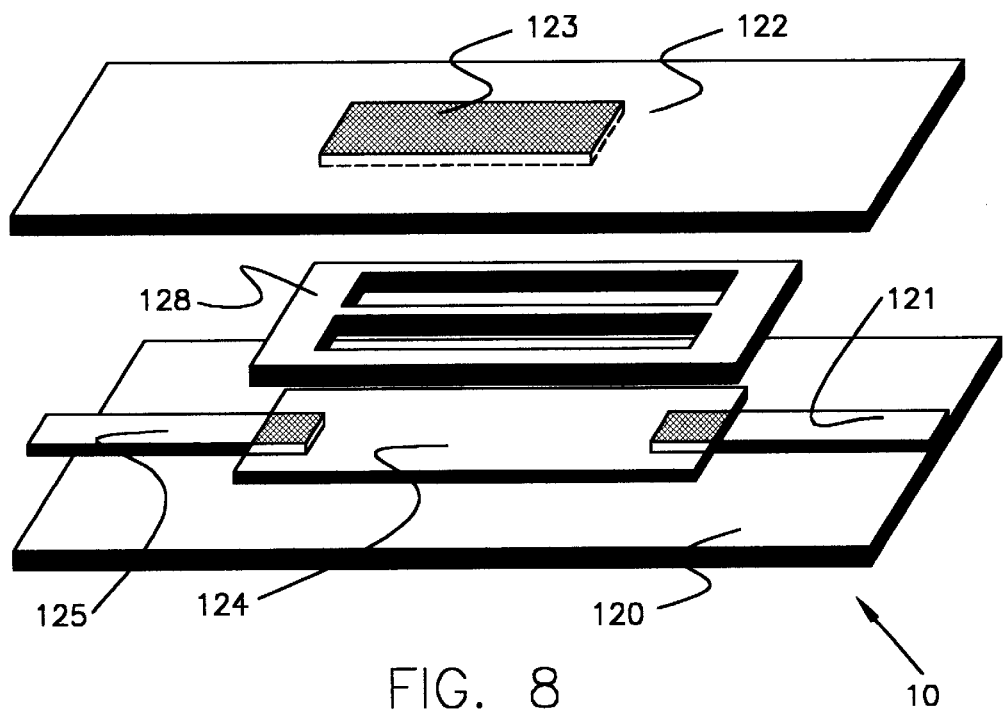
Figure 10:
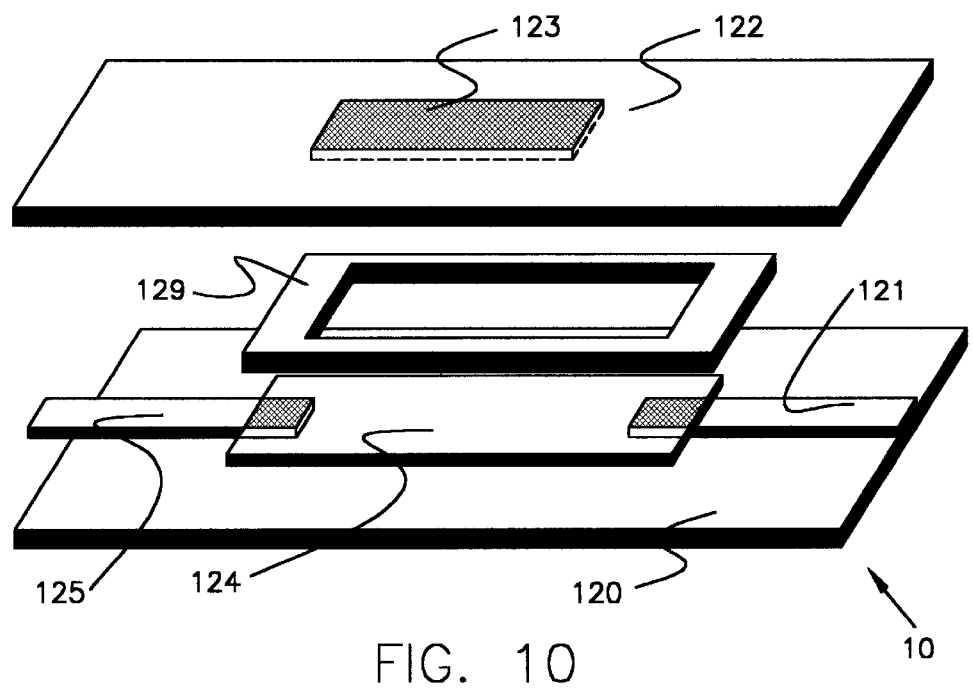

FIGS. 7, 8 and 10 illustrate some of the various configurations of spacers 126 contemplated by the present invention. FIG. 7 illustrates one embodiment, in which several spacer elements 126a are replaced by windowed spacer 127 having a plurality of windows. In this embodiment, windowed spacer 127 performs an identical function to the spacer elements described in connection with FIGS. 1–6. Between each window is spacer material which maintains shunt electrode 123 in a non-conducting arrangement with resistive electrode 124. When a pressure is applied to shunt electrode 123, shunt electrode 123 is displaced through the windows of spacer 127 so as to contact resistive electrode 124 and causes current to be shunted through shunt electrode 123. While the figure shows six windows disposed in spacer 127, it is understood that any number of windows can be disposed therein without deviating from the intended scope of the present invention.

In this embodiment, the greater the number of windows disposed in spacer 127, the greater the resolution of the pressure sensing device. This follows because, as the number of windows increase, the spacer material between each window is closer together, and an applied force is further prevented from spreading. A similar result occurs when the number of spacer elements 126a in the embodiment shown and described in FIG. 17 is increased, because the greater number of spacer elements 126a further prevent shunt electrode 123 from contacting resistive electrode 124 except at the precise location of an applied force.

FIG. 8 shows another embodiment of the invention employing a windowed spacer 128, wherein the windows of the spacer have a different arrangement. In this embodiment, the windows are arranged lengthwise along spacer 128, so as to cause current to be shunted through shunt electrode 123 in a different manner when a pressure is applied to the sensor. FIG. 10 shows still another embodiment of the invention employing a windowed spacer 129, wherein spacer 129 has a single window. As indicated previously, a single window in spacer 129 provides less resolution to the pressure sensing device because an applied force is spread over shunt electrode 123.

Figure 9:
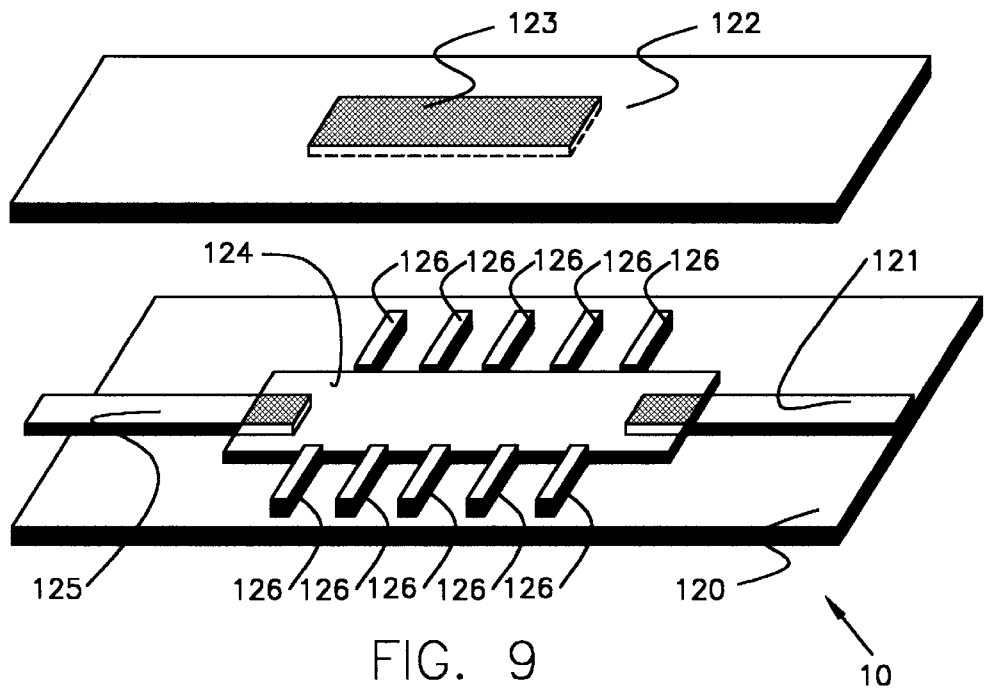

FIG. 9 illustrates still another embodiment of the invention, wherein a plurality of spacer elements 126a are disposed directly on first backing sheet 122, along opposite edges of resistive electrode 124. In this embodiment, the plurality of spacer elements 126a preferably have a height that is greater than the height of resistive electrode 124 relative to first backing sheet 120. In addition, shunt electrode 123 has a width which is greater than the distance between the spacer elements disposed on opposite edges of resistive electrode 124. In this way, when first and second backing sheets 120 and 122 are brought together, shunt electrode 123 is disposed in a non-conductive arrangement with resistive electrode 124. In this embodiment, however, spacer elements 126 do not operate to localize an applied pressure, as previously discussed.

Figure 11:
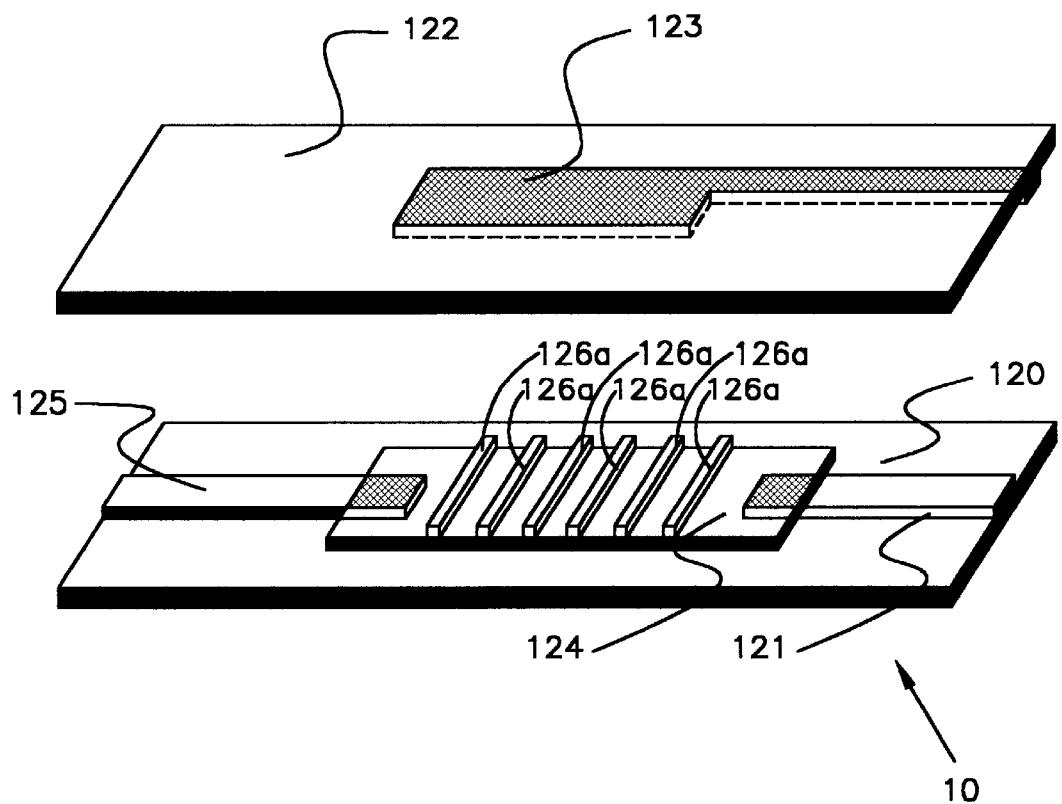

FIG. 11 shows still another embodiment of the present invention, wherein shunt electrode 124 further comprises a connector that extends to the edge of second backing sheet 122. The connector provides a means for electrically connecting shunt electrode 123 to an electrical source or other device, if desired.

Thus, the present invention solves problems associated with devices of the prior art. For instance, according to one embodiment, the present invention does not employ a pressure-sensitive resistive material. Instead, the present invention employs resistive and shunt electrodes that are spaced apart from each other by spacers until a pressure is exerted thereon, so as to measure the width and location of an object exerting pressure on the sensor. Additionally, the present invention avoids the need for calibration due to such variables as temperature, humidity, and aging.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. A pressure sensor apparatus for measuring a linear distance between two outer locations of pressure comprising:

a first electrode and a second electrode, each disposed on one of a pair of backing sheets;

a resistive electrode, having a known electrical resistance, disposed on one of said pair of backing sheets so as to provide an electrical conduction between said first electrode and said second electrode;

a continuous shunt electrode, having a resistance lower than said resistance of said resistive electrode, said shunt electrode disposed on one of said pair of backing sheets; and a plurality of spacer elements, said plurality of spacer elements defining at least one contact region disposed along a length between said first and second electrodes, wherein said plurality of spacer elements are disposed so as to maintain said shunt electrode in a non-conductive arrangement relative to said resistive electrode when substantially no pressure acts thereon, and wherein, upon a pressure being exerted on any portion thereon, said resistive electrode is shunted within said contact region for a distance substantially equal to the distance between said outer locations of said pressure such that said linear distance between two outer locations of pressure is measured in response to a change in resistance across said resistive electrode.

2. The apparatus according to claim 1, wherein said linear distance between said outer locations of said pressure on said sensor corresponds to a change in resistance between said first and second electrodes.

3. The apparatus according to claim 2, wherein a width of an object exerting pressure on said sensor corresponds to a change in resistance between said first and second electrodes.

4. The apparatus according to claim 1, further comprising a connector coupled to said shunt electrode, so as to allow measurement of resistance between said connector and said first electrode wherein a position of an object exerting pressure on said sensor corresponds to a change in said resistance between said first and shunt electrodes.

5. The apparatus according to claim 1, wherein said at least one spacer is a selected from a group consisting of Mylar™, Kapton™ and polyester.

6. The apparatus according to claim 1, wherein said at least one spacer is disposed on at least one of said pair of backing sheets on opposite edges of said resistive electrode, said at least one spacer having a height that is greater than a height of said resistive electrode, and said shunt electrode having a width which is greater than a distance between said spacers.

7. The apparatus according to claim 1, wherein said first, second and shunt electrodes are comprised of a material selected from a group consisting of copper, silver, aluminum and conductive ink.

8. The apparatus according to claim 7, wherein said first, second and shunt electrodes are comprised of conductive ink, said conductive ink comprising a graphite-based polymer thick film ink.

9. The apparatus according to claim 1, wherein said resistive electrode is comprised of a material selected from a group consisting of carbon and a non-conductive ink.

10. The apparatus according to claim 9, wherein said resistive electrode is comprised of non-conductive ink, said non-conductive ink comprising a titanium dioxide resistive ink.

11. The apparatus according to claim 1, wherein at least one of said pair of backing sheets is thin and flexible.

12. The apparatus according to claim 11, wherein one of said pair of backing sheets is comprised of a material selected from the group consisting of Mylar™, Kapton™ and polyester.

13. The apparatus according to claim 1, wherein said pair of backing sheets comprise a plurality of said resistive electrodes and shunt electrodes disposed in parallel to each other.

14. The apparatus according to claim 1, wherein said pressure sensor apparatus is laminated.

15. A pressure sensor device for measuring a linear distance between two outer locations of pressure comprising:
a shunt electrode;
a resistive electrode having a first end and a second end;
a plurality of spacer elements, said plurality of spacer elements defining at least one contact region for providing a contact between said shunt and said resistive electrode, said spacer elements individually dispersed along a length defined between said first and second ends of said resistive electrode, wherein said plurality of spacer elements are disposed so as to maintain said shunt electrode in a non-conductive arrangement relative to said resistive electrode when substantially no pressure acts thereon, and wherein, upon a pressure being exerted on any portion thereon, said resistive electrode is shunted for a distance substantially equal to the distance between said outer locations of said pressure, such that said linear distance between two outer locations of pressure is measured in response to a change in resistance across said resistive electrode.

16. The system according to claim 15, wherein a position of said object on said sensor is measured in response to a change in resistance between said shunt electrode and a location along said resistive electrode.

17. A pressure sensor apparatus for measuring a linear distance between two outer locations of pressure comprising:
a first electrode and a second electrode, each disposed on one of a pair of backing sheets;
a resistive electrode, having a known electrical resistance, disposed on one of said pair of backing sheets so as to provide an electrical conduction between said first electrode and said second electrode;
a continuous shunt electrode, having a resistance lower than said resistance of said resistive electrode, said shunt electrode disposed on one of said pair of backing sheets; and
a spacer defining at least one contact window disposed along a length between said first and second electrodes, wherein said spacer is disposed so as to maintain said shunt electrode in a non-conductive arrangement relative to said resistive electrode when substantially no pressure acts thereon, and wherein, upon a pressure being exerted on any portion thereon, said resistive electrode is shunted for a distance substantially equal to the distance between said outer locations of said pressure such that said linear distance between two outer locations of pressure is measured in response to a change in resistance across said resistive electrode.

18. The apparatus according to claim 17, wherein said linear distance between said outer locations of said pressure on said sensor corresponds to a change in resistance between said first and second electrodes.

19. The apparatus according to claim 18, wherein a width of an object exerting pressure on said sensor corresponds to a change in resistance between said first and second electrodes.

20. The apparatus according to claim 17, wherein a position of an object exerting pressure on said sensor is measured in response to a change in resistance between said first and shunt electrodes.

21. A pressure sensor device for measuring a linear distance between two outer locations of pressure comprising:
a continuous shunt electrode;
a resistive electrode having a first end and a second end;
a spacer defining at least one contact window disposed along a length between said first and second ends of said resistive electrode, wherein said spacer is disposed so as to maintain said shunt electrode in a non-conductive arrangement relative to said resistive electrode when substantially no pressure acts thereon, and wherein, upon a pressure being exerted on any portion thereon, said resistive electrode is shunted for a distance substantially equal to the distance between said outer locations of said pressure such that said linear distance between two outer locations of pressure is measured in response to a change in resistance across said resistive electrode.

22. The apparatus according to claim 21, wherein said linear distance between said outer locations of said pressure on said sensor corresponds to a change in resistance between said first and second ends of said resistive electrode.

23. The apparatus according to claim 22, wherein a width of an object exerting pressure on said sensor corresponds to a change in resistance between said first and second ends of said resistive electrode.

24. The apparatus according to claim 21, wherein a position of an object exerting pressure on said sensor is measured in response to a change in resistance between said first end of said resistive electrode and said shunt electrode.

25. A pressure sensor apparatus for measuring a linear distance between two outer locations of pressure comprising:

a first electrode and a second electrode, each disposed on one of a pair of backing sheets;

a resistive electrode, having a known electrical resistance, disposed on one of said pair of backing sheets so as to provide an electrical conduction between said first electrode and said second electrode;

a continuous shunt electrode, having a resistance lower than said resistance of said resistive electrode, said shunt electrode disposed on one of said pair of backing sheets; and a plurality of spacer elements, said plurality of spacer elements defining at least one contact region disposed along a length between said first and second electrodes, wherein said plurality of spacer elements are disposed so as to maintain said shunt electrode in a non-conductive arrangement relative to said resistive electrode when substantially no pressure acts thereon, and wherein, upon a pressure being exerted on any portion thereon, said resistive electrode is shunted within said contact region for a distance substantially equal to the distance between said outer locations of said pressure such that a position of one of said outer locations of said pressure is measured in response to a resistance between said first and shunt electrodes.

26. The apparatus according to claim 25, wherein said shunt electrode further comprises a connector for measuring said resistance between said shunt electrode and said first electrode.

27. The apparatus according to claim 25, wherein said shunt electrode further comprises a connector for measuring said resistance between said shunt electrode and said first electrode, before and after exertion of said pressure.

28. The apparatus according to claim 25 wherein said distance between said outer locations of pressure is measured in response to a change in resistance of said resistive electrode, before and after exertion of said pressure.

* * * * *